United States Patent
Magno, Jr. et al.

(10) Patent No.: US 9,151,309 B2
(45) Date of Patent: Oct. 6, 2015

(54) EXPANSION CLAMP

(75) Inventors: Joey D. Magno, Jr., Cordova, TN (US);
Robert K. Jolly, Cordova, TN (US)

(73) Assignee: Thomas & Betts International LLC, Wilmington, DE (US)

(*) Notice: Subject to any disclaimer, the term of this patent is extended or adjusted under 35 U.S.C. 154(b) by 661 days.

(21) Appl. No.: 13/215,262

(22) Filed: Aug. 23, 2011

(65) Prior Publication Data

US 2012/0057927 A1    Mar. 8, 2012

Related U.S. Application Data

(60) Provisional application No. 61/379,624, filed on Sep. 2, 2010.

(51) Int. Cl.
*F16B 7/04* (2006.01)
*F16B 2/18* (2006.01)

(52) U.S. Cl.
CPC ............... *F16B 7/0413* (2013.01); *F16B 2/18* (2013.01); *Y10T 29/49948* (2015.01); *Y10T 403/54* (2015.01)

(58) Field of Classification Search
USPC ......... 403/257, 256, 254, 348, 252, 253, 255; 411/349, 549, 553, 552, 84, 85
See application file for complete search history.

(56) References Cited

U.S. PATENT DOCUMENTS

| | | | |
|---|---|---|---|
| 4,708,555 A | 11/1987 | Terry | |
| 4,830,531 A * | 5/1989 | Condit et al. | 403/348 |
| 4,834,569 A | 5/1989 | Foote et al. | |
| 4,975,014 A | 12/1990 | Ruffin et al. | |
| RE33,827 E | 2/1992 | Terry | |
| 5,279,031 A | 1/1994 | Carruthers et al. | |
| 5,522,688 A | 6/1996 | Reh | |
| 5,655,865 A * | 8/1997 | Plank et al. | 411/85 |
| 5,839,321 A | 11/1998 | Siemons | |
| 6,212,917 B1 | 4/2001 | Rathbun | |
| 6,325,301 B1 * | 12/2001 | Vanhonacker | 238/382 |
| 6,390,747 B1 | 5/2002 | Commins | |
| 6,585,469 B2 | 7/2003 | Commins | |
| 6,827,531 B2 * | 12/2004 | Womack et al. | 410/104 |
| 6,846,140 B2 * | 1/2005 | Anderson et al. | 410/104 |
| 6,948,687 B2 | 9/2005 | Shatzky | |
| 6,991,414 B1 | 1/2006 | Mensah | |
| 7,037,060 B2 | 5/2006 | Commins | |
| 7,044,701 B2 * | 5/2006 | Herb | 411/84 |

* cited by examiner

*Primary Examiner* — Daniel Wiley
(74) *Attorney, Agent, or Firm* — Snyder, Clark, Lesch & Chung, LLP

(57) ABSTRACT

An assembly includes a first structure and a clamp. The first structure may have an opening located on a first surface and the opening includes a keyway. The clamp is configured to clamp a second structure to the first structure. The clamp may include a head configured to be inserted above the opening in the first structure. The clamp may also include a body coupled to the head. An upper portion of the body may include formations located on opposite sides of the body and a lower portion of the body is threaded. The clamp may further include a nut coupled to the body. The nut may be configured to be rotated such that when the formations on the body are aligned with the keyway in the first structure, the head of the clamp is configured to lower onto the second structure and secure the second structure to the first structure.

18 Claims, 19 Drawing Sheets

US 9,151,309 B2

EXPANSION CLAMP

RELATED APPLICATION

This application claims priority under 35 U.S.C. §119 based on U.S. Provisional Patent Application No. 61/379,624, filed Sep. 2, 2010, the disclosure of which is hereby incorporated herein by reference.

BACKGROUND INFORMATION

Support structures, such as those used to support a large number of solar panels, typically include several components that are secured to each other via conventional hardware connections (e.g., bolts, nuts, washers, etc.). One drawback with such support structures is that the hardware connection mechanisms used to hold various components of the structure together do not readily allow for thermal expansion or contraction of the support structures or the devices supported by the support structures. As a result, the support structures may fail or cause other problems when thermal expansion/contraction occurs.

In addition, conventional hardware connection mechanisms used to secure components of the support structure to other components usually require specialized tools, such as a torque wrench, to measure the proper torque setting to achieve the proper clamping force for the particular type of structure. Using such tools is often time consuming with respect to erecting the support structure.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a clamp that that allows components connected to one another to achieve structural integrity/rigidity, while also allowing for thermal expansion and contraction of the components. In an exemplary embodiment, the clamp may be used in combination with a support component, referred to herein as a "joiner" component, that aids in connecting one support structure (e.g., a strut) to another support structure (e.g., another strut). The clamp may include a clamping head and a rotatable nut. In one exemplary embodiment, a strut may be lowered into an opening in the joiner component. The clamping head may be inserted into an opening or slot in the joiner component and an installer may turn the rotatable nut. Upon turning the nut, the clamping head may drop down onto a portion of the strut to secure the strut to the joiner component. Further turning of the nut may tighten the clamp and allows the spring to provide the clamp force regardless of torque applied to the nut. The resulting structure has sufficient structural rigidity to support the struts, while simultaneously allowing for thermal expansion and contraction of the structure, as well as thermal expansion and/or contraction of components supported by the structure. In addition, erecting the structure may not require the use of specialized tools, such as torque wrenches.

Figure 1A:
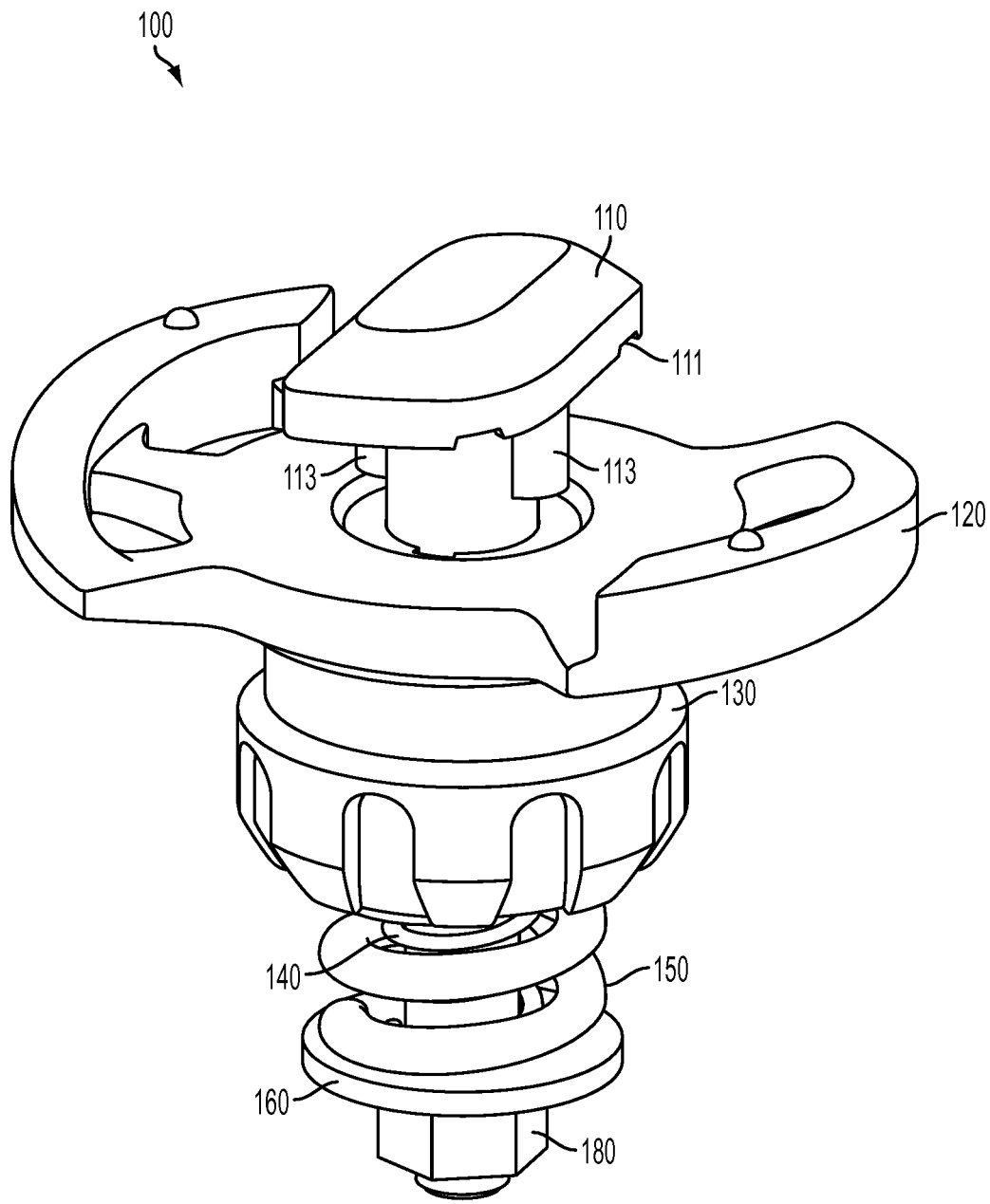
FIG. 1A is an isometric view of an expansion clamp consistent with an exemplary implementation.

FIG. 1A is an isometric view of an exemplary clamp assembly 100 (also referred to herein as expansion clamp assembly 100 or expansion clamp 100) consistent with embodiments described herein. Referring to FIG. 1A, expansion clamp 100 includes T-bolt 110, external expansion cam 120, expansion nut 130, lift spring 140 (also referred to herein as retaining spring 140), compression spring 150, washer 160, lock washer 170 (not shown in FIG. 1A) and nut 180. In an exemplary implementation, the components illustrated in FIG. 1A may be fabricated out of metal, such as steel (e.g., galvanized steel), aluminum or some other metal. In other implementations, all or some of the components illustrated in FIG. 1A may be fabricated using other materials, such as plastic or composite materials.

Figure 1B:
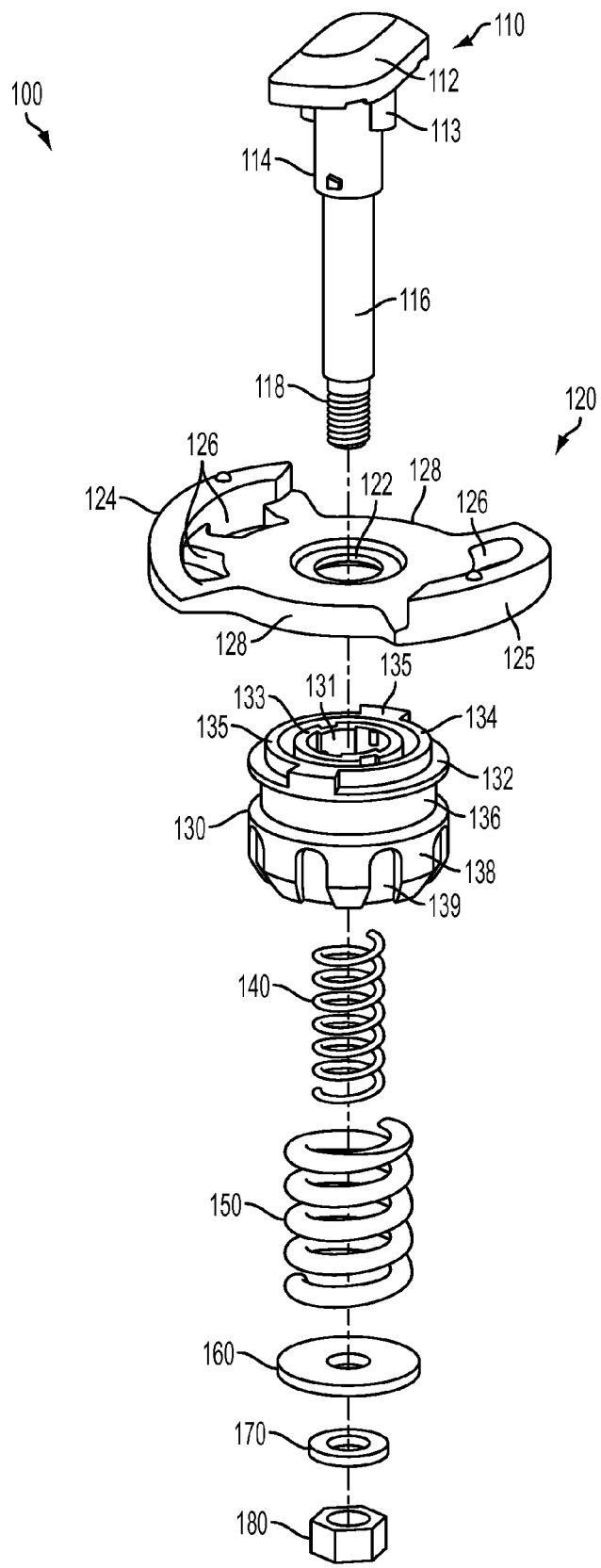
FIG. 1B is an exploded view of the expansion clamp of FIG. 1A.

FIG. 1B illustrates an exploded view of clamp 100. Referring to FIG. 1B, T-bolt 110 may include clamping head 112, neck portion 114 and bolt 116 (also referred to herein as bolt body 116) connected to one another and/or formed as a unitary T-shaped structure. The top of clamping head 112 may have a parallelogram-like shape, with two substantially parallel shorter sides and two substantially parallel longer sides. The lower surface of clamping head 112 may include indentations 111 (FIG. 1A) located on either side of clamping head 112. Indentations 111 may be used to receive portions of a structure clamped by clamp 100.

T-bolt 110 may include extensions 113 (also referred to herein as key portions 113) located on either side of neck 114 that extend outwardly in the radial direction from neck 114. Key portions 113 may align with keyways or slots of a support member when clamp 100 is in a clamped position, as described in more detail below. The lower portion of bolt 116 may include a threaded portion 118 used to secure T-bolt 110 to nut 180, as also described in more detail below.

T-bolt 110 may be inserted into an opening in external expansion cam 120. For example, referring to FIG. 1B, bolt 116 of T-bolt 110 may be inserted into an oval-shaped opening or bore 122 in a center portion of expansion cam 120. Bolt 116 may engage lift spring 140 and the threaded portion 118 of bolt 116 may extend through lift spring 140. That is, lift spring 140 may encircle or surround bolt 116 when T-bolt 110 is inserted into bore 122 and threaded portion 118 may extend through expansion cam 120, expansion nut 130, springs 140 and 150 and washers 160 and 170 and mate with corresponding threads on nut 180 to secure components 120-170 to T-bolt 110.

External expansion cam 120 may include sidewall portions 124 and 125 separated by open areas 128 that define a relatively circular shape for expansion cam 120. Sidewall portion 124 may be angled such that one side of sidewall portion 124 may have a lower height than the other side of sidewall portion 124, as illustrated in FIG. 1B. Sidewall portion 125 may have a substantially planar top surface, as also illustrated in FIG. 1B. The planar lower surfaces of expansion cam 120 includes a number of openings 126 located between the sidewall portions 124 and 125, respectively, and the central portion of expansion cam 120. In an exemplary implementation, expansion cam 120 may include three openings 126, as illustrated in FIG. 1B.

Expansion nut 130 may include top portion 132, middle portion 136 and bottom portion 138. Top portion 132 may include opening 131 through which bolt 116 passes. For example, top portion 132 may include a first cylindrical portion 133 defining opening 131, as illustrated in FIG. 1B. Opening 131 aligns with bore 122 such that bolt 116 passes through external expansion cam 120 and expansion nut 130. The upper surface of cylindrical portion 133 may mate with the underside of expansion cam 120. In an exemplary implementation, bore 122 and opening 131 include slots that align with key portions 113 such that when nut 130 is rotated and key portions 113 of clamping head 112 align with slots a joiner component, key portions 113 will also align with slots in bore 122 and opening 131, such that clamping head 112 will drop or lower onto a component to be clamped, as described in more detail below.

Top portion 132 also includes a second cylindrical portion 134 with side pieces 135 that extend radially from cylindrical portion 134. Side pieces 135 may mate with corresponding openings on the bottom of expansion cam 120 such that when clamp 100 is assembled as in FIG. 1A, expansion nut 130 is secured to expansion cam 120 and expansion cam 120 may rotate upon turning of nut 130, as described in detail below.

Middle portion 136 may include a cylindrical portion that is smaller in diameter than the outer circumference of top portion 132 and bottom portion 138. Bottom portion 138 may include semi-rectangular indentations 139 located around the circumference of bottom portion 138. Indentations 139 provide an easy to grasp surface to allow an installer to hand rotate/tighten expansion nut 130, as described in detail below. In some implementations, the installer may use a spanner wrench to rotate/turn expansion nut 130.

Opening 131, as described above, may align with bore 122 in expansion cam 120. In an exemplary implementation, opening 131 may be sized to retain lift spring 140 to help ensure that lift spring 140 stays in place within opening 131. Lift spring 140 may extend around the lower surface of T-bolt 116, as illustrated in FIG. 1A. Lift spring 140 may help retain T-bolt 110 and ensure that T-bolt 110 does not rotate prior to T-bolt 110 being secured via key portions 113 and corresponding keyways, as described in more detail below.

Compression spring 150 may also extend around the lower portion of T-bolt 110 and around lift spring 140 between the lower portion of expansion nut 130 and the upper surface of washer 160. Compression spring 150 may act to provide a biasing force on expansion nut 130. Compression spring 150 may also allow for thermal expansion and/or contraction of elements secured by clamp 100. For example, compression spring 150 may allow clamp assembly 100 to move upward/downward when forces, such as forces associated with thermal expansion or contraction are exerted on clamp assembly 100. Such movement allows clamp 100 to remain secured, while also allowing for thermal expansion and contraction of members connected by clamp 100, as well as thermal expansion and contraction of members (e.g., solar panels) supported by structures connected by clamp 100.

Washer 160 may be a flat washer located between lock washer 170 and compression spring 150. Lock washer 170 may be located between the lower surface of washer 160 and the upper surface of nut 180. Washers 160 and 170 may act to secure nut 180 to T-bolt 110. For example, as described above, the lower portion 118 of T-bolt 110 may be threaded to allow components 120-170 to be secured to T-bolt 110. That is, nut 180 may be threaded onto lower portion 118 of T-bolt 110 to secure components 120-170 to T-bolt 110, as illustrated in FIG. 1A. Lock washer 170 may help ensure that nut 180 remains tightly secured to lower portion 118 of T-bolt 110.

Figure 2A:
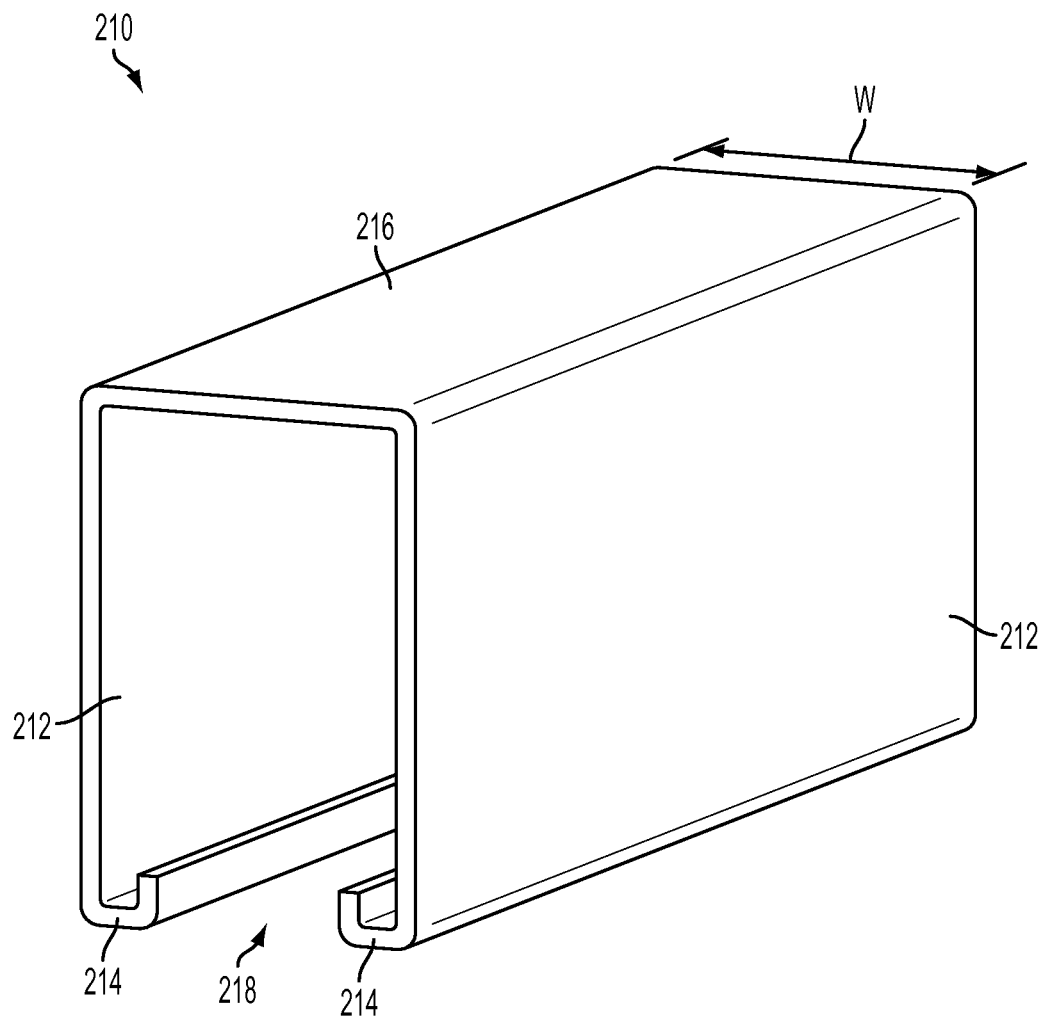
FIGS. 2A and 2B illustrate structures secured to each other by the clamp of FIG. 1A.

Clamp 100 may be used to clamp various components together, such as support structures used to support a large number of solar panels. For example, FIG. 2A illustrates a framing structure 210, also referred to herein as strut 210, to which clamp 100 may connect another framing structure via a joiner component, as described in more detail below. Referring to FIG. 2A, strut 210 may be a framing element fabricated using metal, plastic or some composite material. In one implementation, a large number of struts 210 may form a structure (sometimes referred to as a solar table) upon which solar panels may be mounted.

Strut 210 may include sides 212 and top 216. Strut 210 may have a substantially C-shaped cross-sectional shape, as illustrated in FIG. 2A. Sides 212 of strut 210 may also include J-shaped extensions 214, also referred to as lips or rims 214, that extend from the sides of strut 210, as also illustrated in FIG. 2A. Extensions 214 may contact clamping head 112 when clamp 100 is in the clamped position with respect to strut 210, as described in detail below.

Figure 2B:
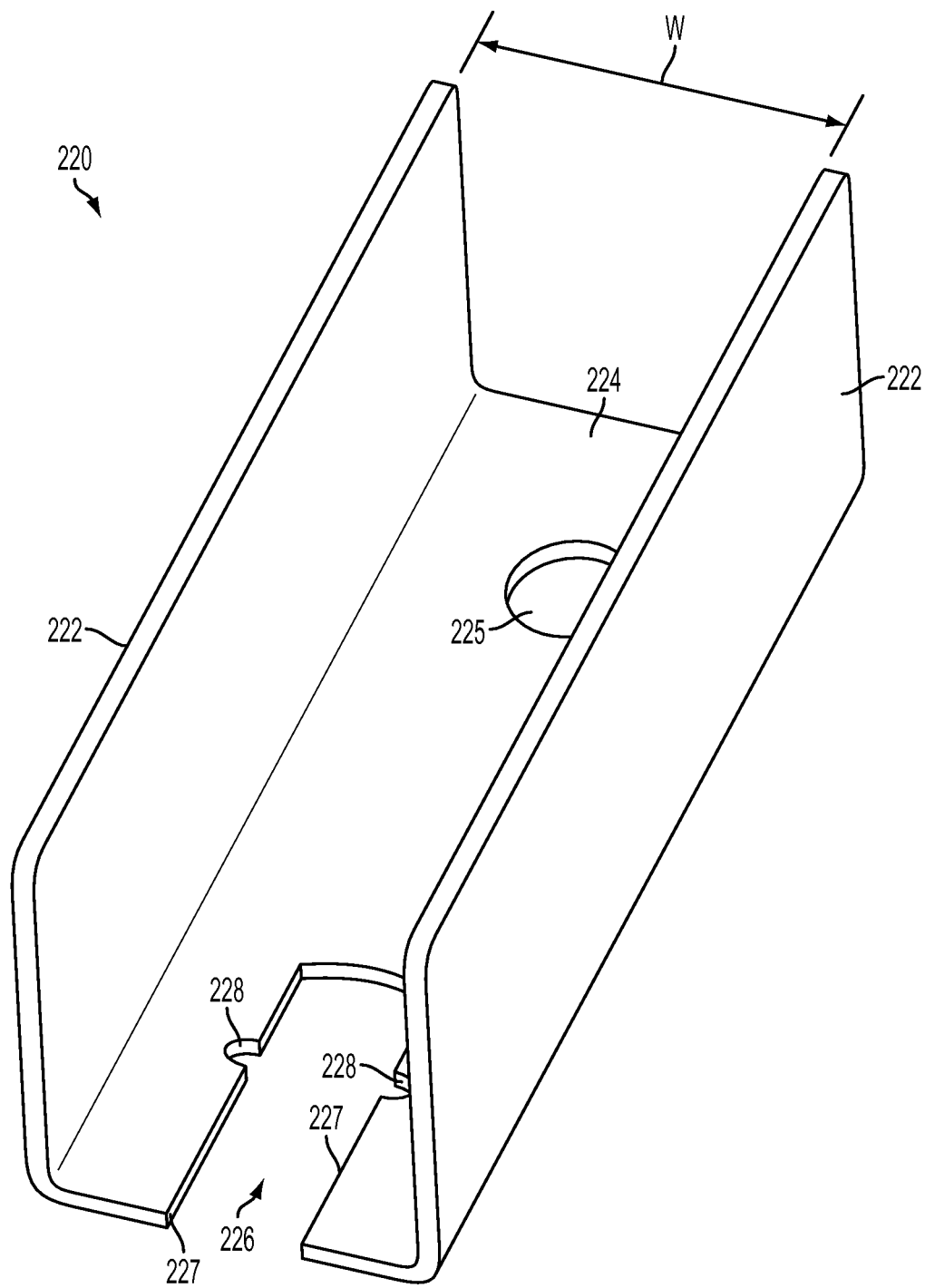

In an exemplary implementation, the lower portion of strut 210 may form an opening to receive clamping head 112. For example, the area between extensions 214 forms opening 218 that is designed to receive clamping head 112. In an exemplary implementation, clamp 100 may be used to clamp strut 210 to another strut 210 via a "joiner" component. For example, FIG. 2B illustrates joiner 220. Referring to FIG. 2B, joiner 220 may include sides 222 and bottom 224. In an exemplary implementation, joiner 222 has a U-shaped cross section, as illustrated in FIG. 2B. Bottom portion 224 may include a generally rectangular shaped opening 226 located at one end and a circular opening 225 located toward the other end of joiner 220, as illustrated in FIG. 2B. Opening 226 may include two slots, notches or keyways 228 that extend from sides 227 of opening 226. Keyways 228 will align with key portions 113 of clamp 100 when expansion nut 130 is rotated, as described in more detail below. In an exemplary implementation, clamping head 112 of clamp 100 and opening 226 may be sized such that clamping head 112 fits in opening 226.

Opening 225 may be used to secure joiner 220 to one strut 210 while opening 226 may be used to secure joiner 220 to another strut 210. For example, opening 225 may be used to receive a nut and bolt to secure one end of joiner 220 to a strut 210. In other instances, one end of joiner 220 (e.g., the end including opening 225) may be welded to a strut 210. In either case, joiner 220 may be rigidly connected to one strut 210 at one end. The other end of joiner 220 at slot 226 may be used to secure another strut 210 to joiner 220 via clamp 100, as described in detail below.

Joiner 220 may have slightly greater inner width (labeled W in FIG. 2B) than the outer width of strut 210 (labeled W in FIG. 2A) to allow joiner 220 to receive strut 210. For example, in one exemplary implementation, strut 210 may be lowered into the open portion of joiner 220 such that sidewalls 212 of strut 210 abut sidewalls 222 of joiner 220.

Figure 2C:
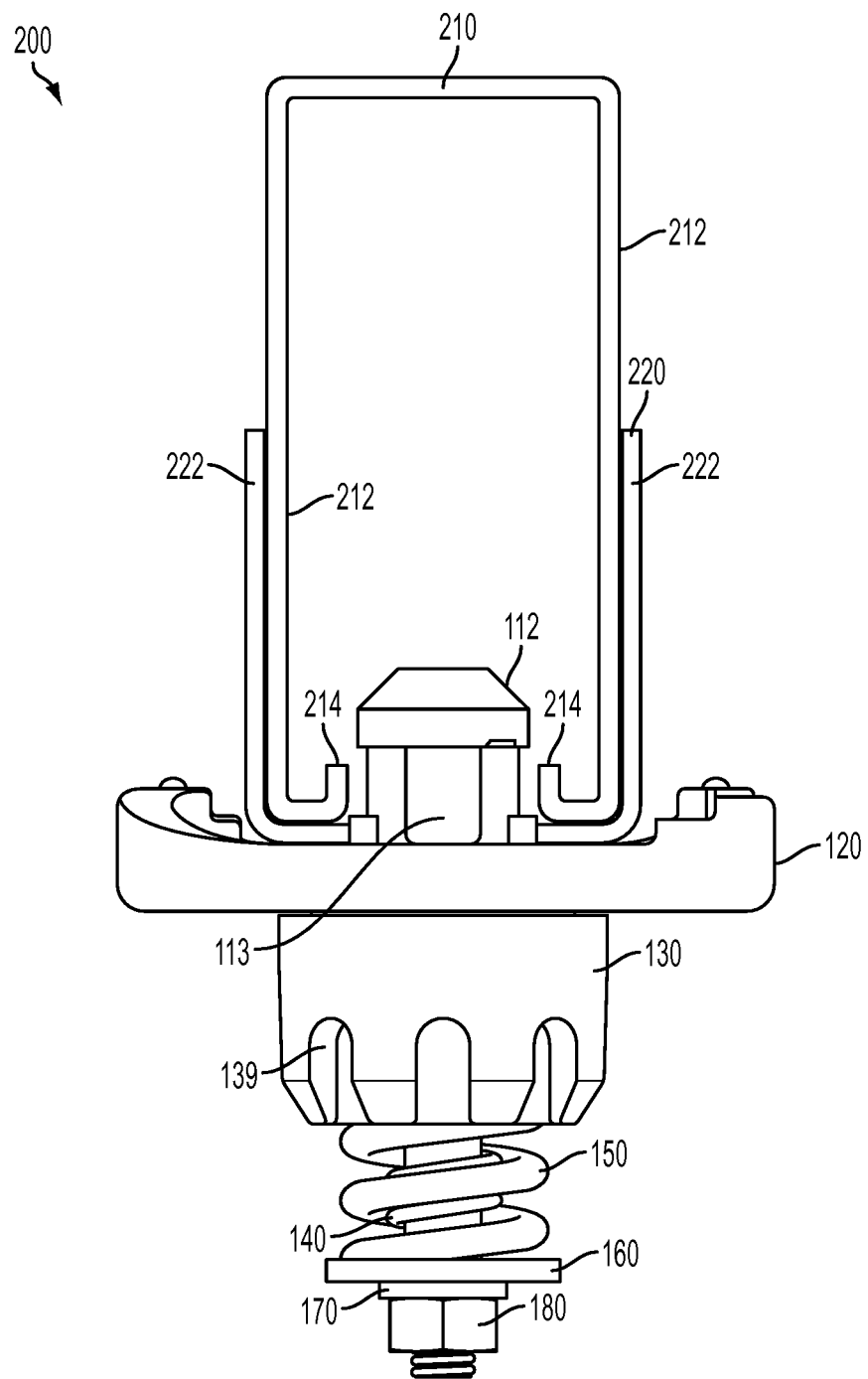
FIGS. 2C-2E illustrate various steps in using the clamp of FIG. 1A to secure the structures illustrated in FIGS. 2A and 2B to each other.

FIG. 2C illustrates strut 210 inserted into the opening of joiner 220 with clamp 100 also inserted through opening 226 (not labeled in FIG. 2C). As illustrated, sides 212 of strut 210 abut sides 222 of joiner 220. Clamp assembly 100 may secure strut 210 to joiner 220. For example, clamping head 112 of clamp 100 may be inserted through opening 226 such that the longer sides of clamping head 112 are substantially parallel to the sides of opening 226, as illustrated in FIG. 2C. In the unclamped position, key portions 113 ensure that T-bolt 110 remains in the upward mounting position. That is, key portions 113 are not aligned with slots 228 of joiner 220 and therefore, clamping head 112 of T-bolt 110 remains in the upward mounting position.

Figure 2D:
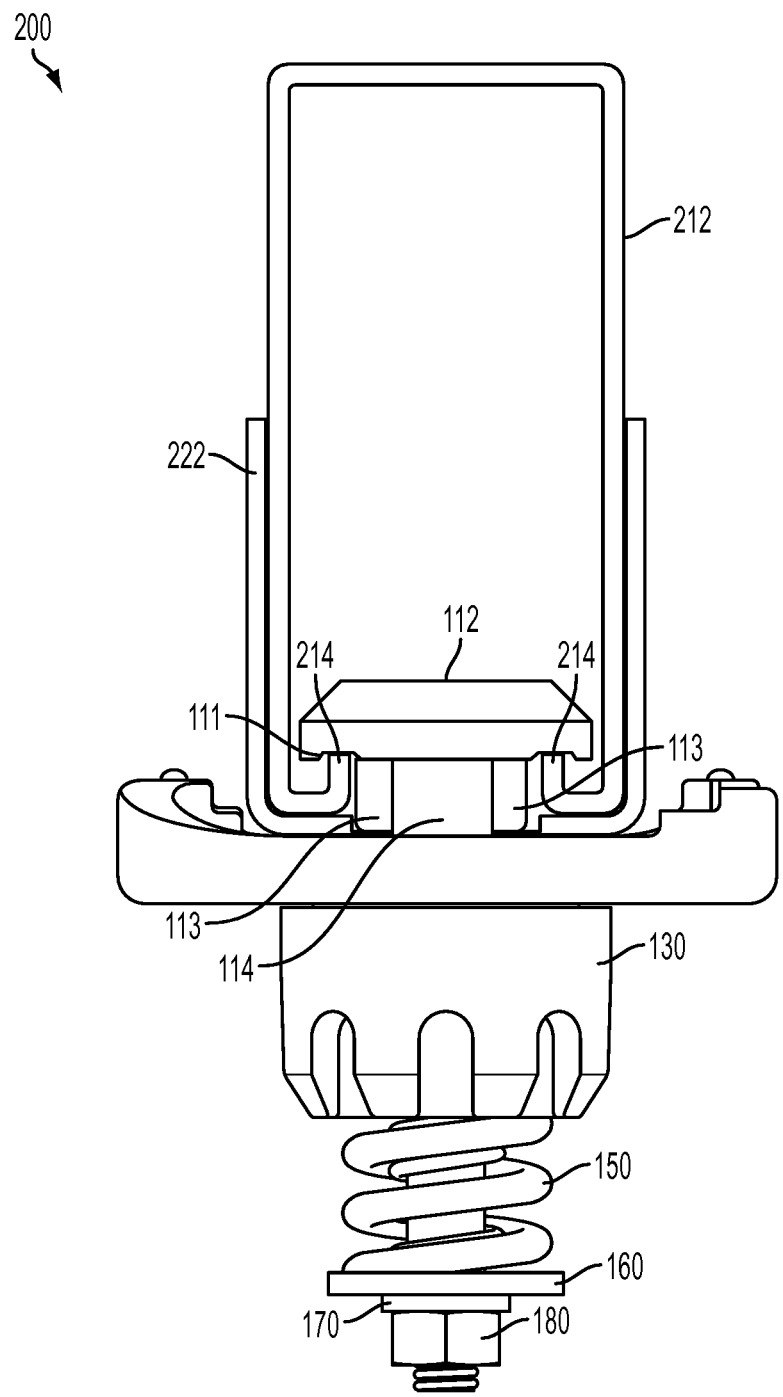

After clamping head 112 is inserted into opening 226 of joiner 220 as described above with respect to FIG. 2C, an installer may rotate expansion nut 130 approximately 90° (e.g., a ¼ turn). As discussed above, in some implementations, the installer may turn nut 130 by hand by grasping indentations 139. Alternatively, the installer may use a spanner wrench or other tool to rotate nut 130. When expansion nut 130 is rotated, clamping head 112 of T-bolt 110 will rotate. The parallelogram-like shape of clamping head 112 allows clamping head 112 to rotate when expansion nut 130 is rotated such that the longer sides of clamping head 112 are perpendicular to opening 226 of joiner 220 and clamping head 112 will drop onto rims 214 of strut 210, as illustrated in FIG. 2D. For example, when T-bolt 110 is rotated, clamping head 112 and neck 114 will rotate until "key" portions 113 align with and pass through slots 228 (e.g., a keyway) located on the surface of joiner 220. This allows clamping head 112 to drop onto rims 214 and secures clamp 100 to strut 210, as illustrated in FIG. 2D. As also illustrated in FIG. 2D, indentations 111 located on each side of the lower portion of clamping head 112 may contact rims 214 to aid in holding clamping head 112 onto rims 114.

Figure 2E:
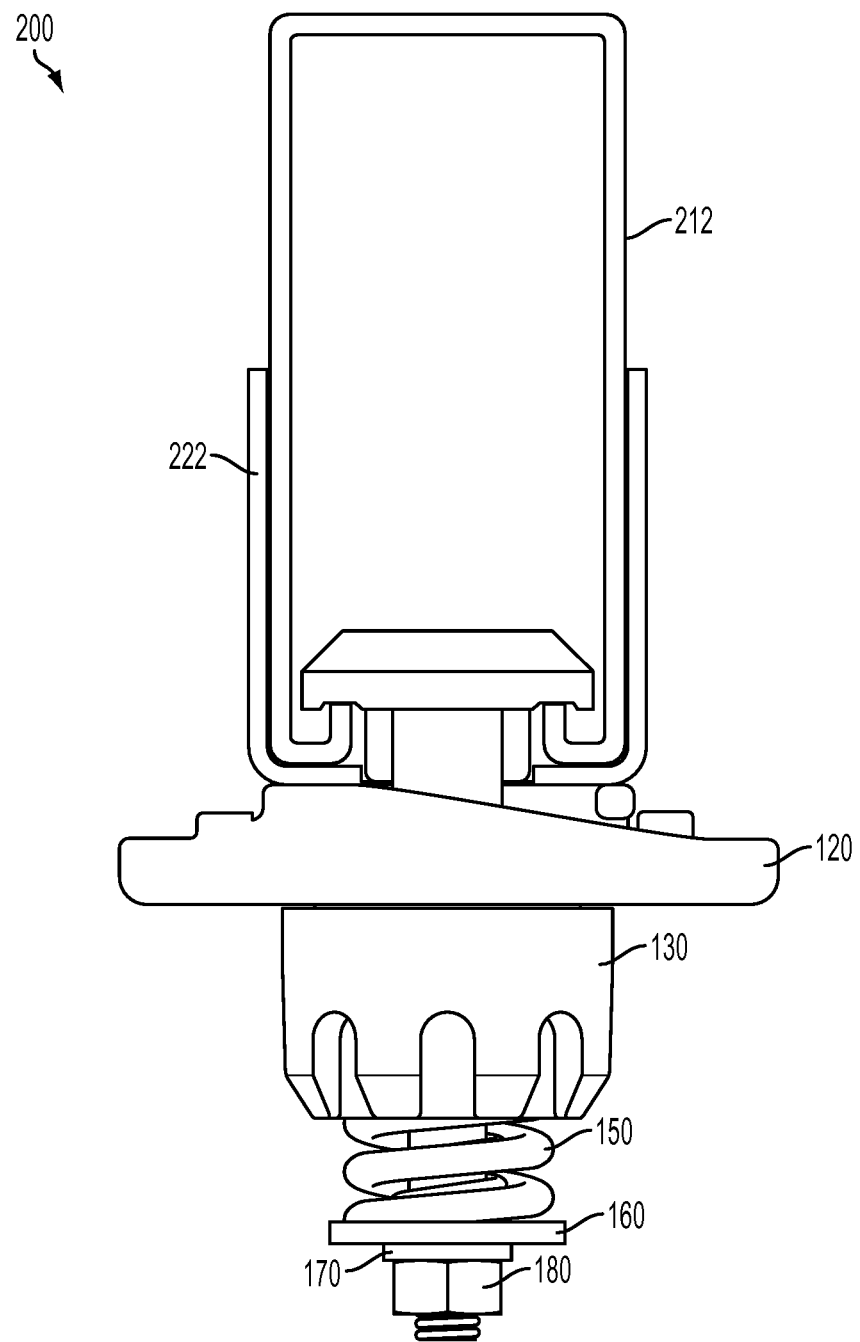

After T-bolt 112 is secured to strut 210 as illustrated in FIG. 2D, the installer will continue to rotate expansion nut 130 another 90° (i.e., ¼ turn). This rotation will cause external expansion cam 120 to rotate and compress compression spring 150 with sufficient force to fasten strut 210 to joiner 220. For example, as illustrated in FIG. 2E, upon the additional rotation of expansion nut 130, expansion cam 120 rotates and compression spring 150 compresses. This further turning of expansion nut 130 ensures that joiner 220 is secured to strut 210. In some implementations, when clamp 100 is in the clamped position, an indicator on external expansion cam 120 may align with a corresponding indicator on expansion nut 130 (not shown in FIG. 2E) to let the installer know that clamp 100 is in the clamped position.

Figure 3A:
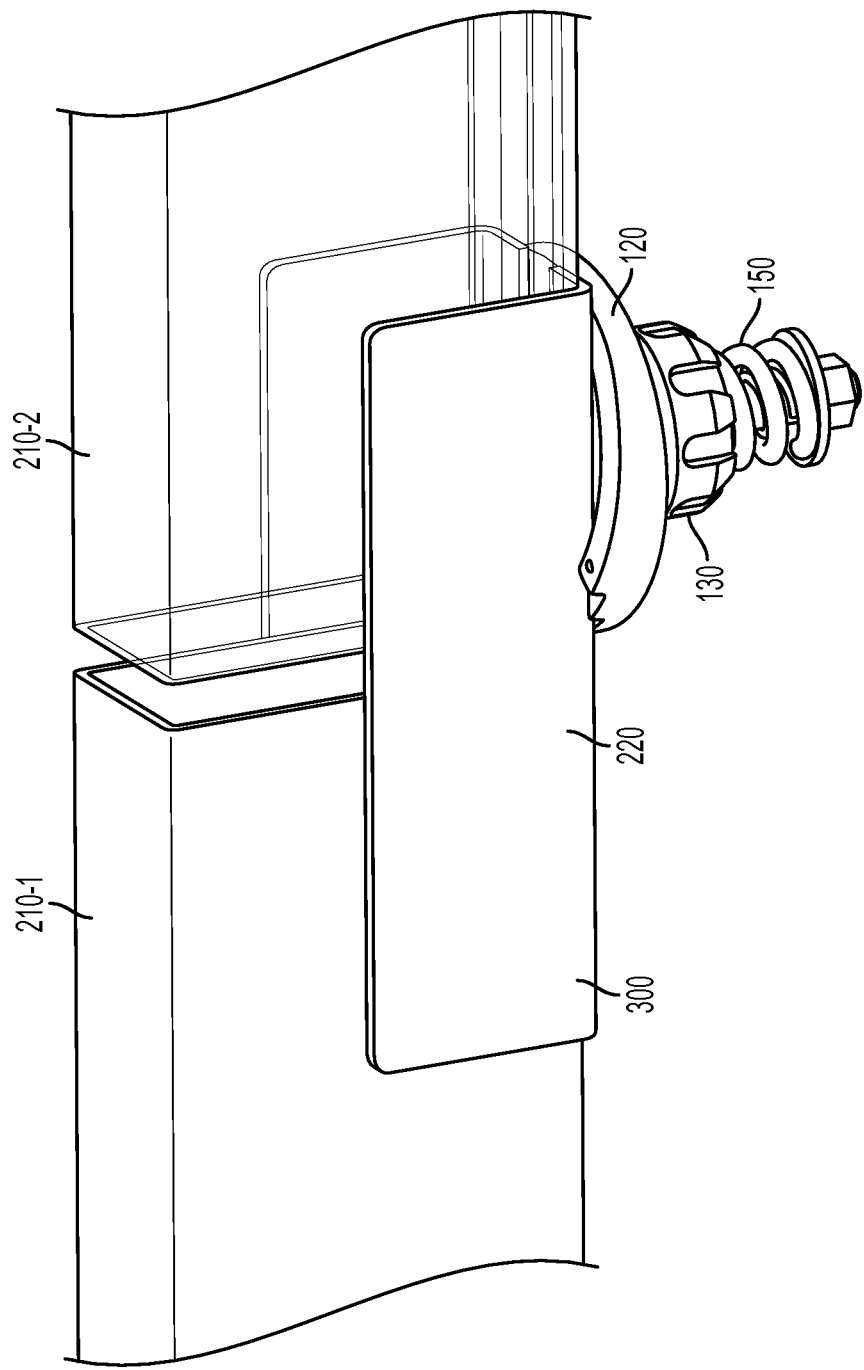
FIGS. 3A and 3B illustrate two strut structures connected via a joiner component according to an exemplary implementation.

As described above, joiner 220 may couple one strut 210 to another strut 210. For example, FIG. 3A illustrates two struts 210-1 and 210-2 connected via joiner 220 and clamp 100. In FIG. 3A, joiner 220 may be welded to strut 210-1 or otherwise fixedly attached to strut 210-1 at area 300 (e.g., via a bolt through opening 225). For example, as described above with respect to FIG. 2B, joiner 220 may include an opening 225 for bolting or welding joiner 220 to strut 210-1. In either case, joiner 220 may be used to connect strut 210-2 to joiner 220 (and strut 210-1) via clamp 100. In the orientation illustrated in FIG. 3A, expansion cam 120 is in the position corresponding to FIG. 2D. That is, expansion nut 130 has been rotated approximately ¼ of a turn and clamping head 112 (not shown) in FIG. 3A has dropped onto rims 214.

Figure 3B:
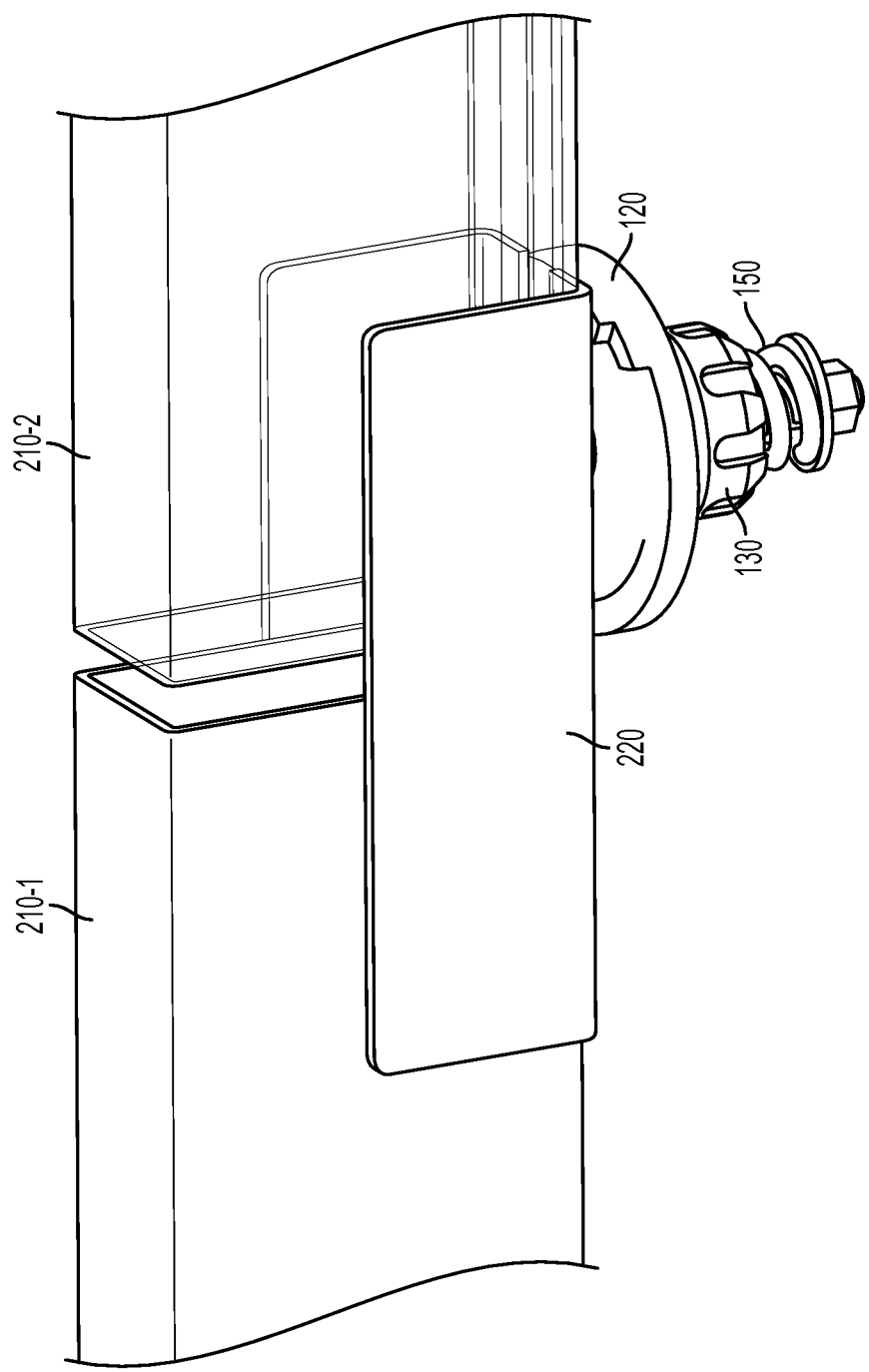

FIG. 3B illustrates the positioning of expansion cam 120 after expansion nut 130 has been rotated another 90° (e.g., ¼ of a turn), which corresponds to the positioning associated with FIG. 2E. In this position, expansion cam 120 has been rotated and compression spring 150 has been compressed to secure joiner 220 to strut 210-2. In this manner, struts 201-1 and 210-2 are connected via joiner 220. In installations in which the support structure spans, for example, several hundred feet, a large number of struts 210 may be connected via joiners 220, as illustrated in FIG. 3B.

Figure 4:
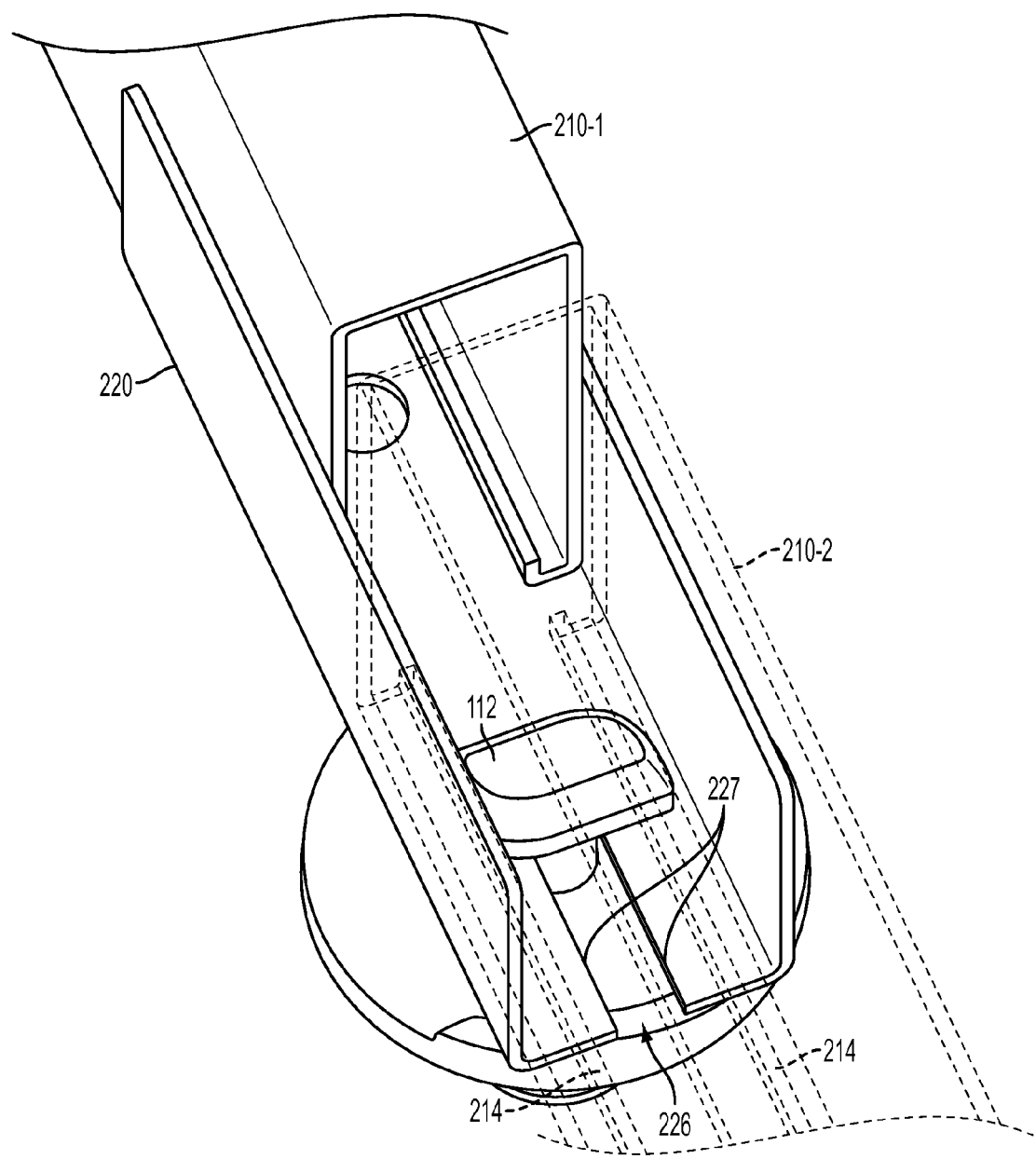
FIG. 4 is a top perspective view illustrating the orientation of the T-bolt of FIG. 1A with respect to the strut of FIG. 2A while in the clamped position.

FIG. 4 illustrates another isometric view of clamp 100 connecting strut 210-2 to joiner 220. In FIG. 4, strut 210-2 is illustrated in a transparent manner to illustrate clamping head 112 located between sides 227 of joiner 220. As illustrated, clamping head 112 has been rotated such that the longer sides of clamping head 112 are perpendicular to opening 226 of joiner 220. In this position, clamping head 112 contacts rims 214 of strut 210-2, as described above and illustrated in FIGS. 2D and 2E.

Figure 5A:
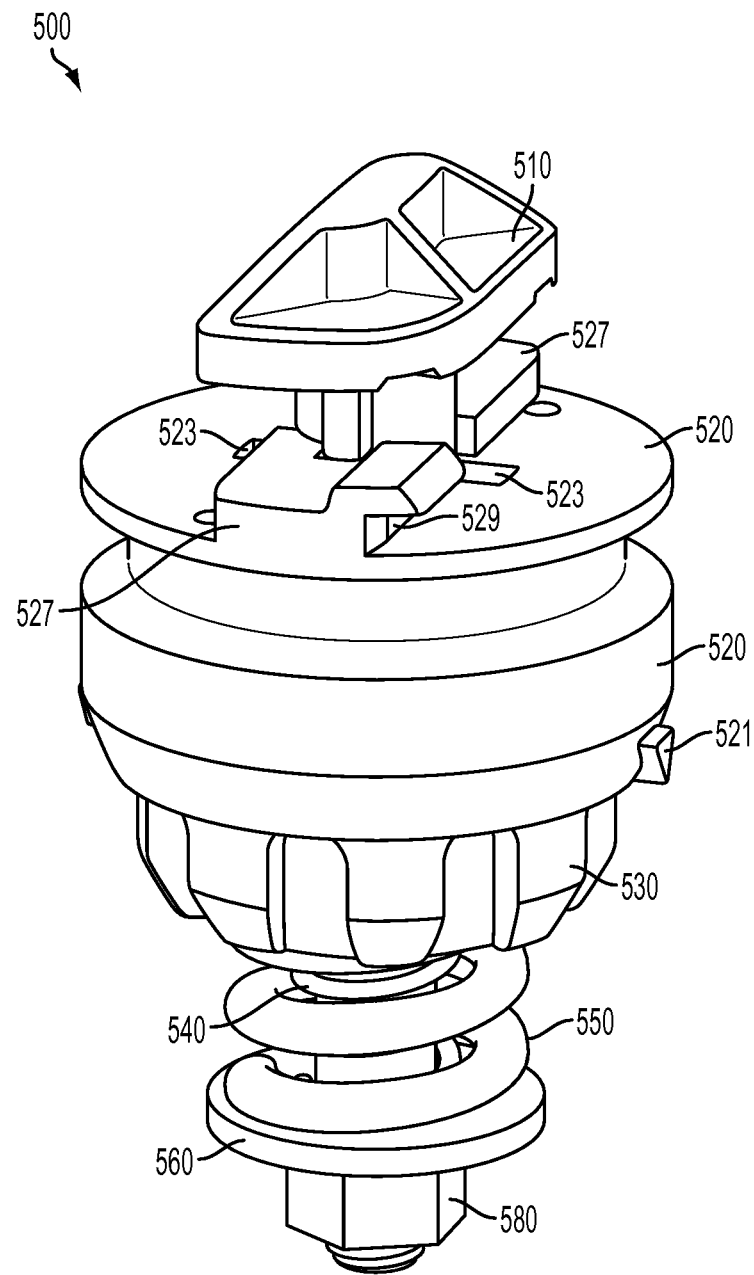
FIGS. 5A and 5B are a perspective view and exploded view, respectively, of an expansion clamp in accordance with another exemplary implementation.

FIG. 5A is an isometric view of an exemplary clamp assembly 500 (also referred to herein as expansion clamp assembly 500 or expansion clamp 500) consistent with another embodiment described herein. In the embodiment illustrated in FIG. 5A, clamp 500 is configured similarly to clamp 100 with the difference being that an internal expansion cam is used in clamp 500 as opposed to the external expansion cam 120 of clamp 100, as described in detail below. Referring to FIG. 5A, expansion clamp 500 includes T-bolt 510, internal expansion cam 520, internal expansion cam/nut 530, lift spring 540, compression spring 550, washer 560, lock washer 570 (not shown in FIG. 5A) and nut 580. In an exemplary implementation, the components illustrated in FIG. 5A may be fabricated out of metal, such as steel (e.g., galvanized steel), aluminum or some other metal. In other implementations, all or some of the components illustrated in FIG. 5A may be fabricated using other materials, such as plastic or composite materials.

Figure 5B:
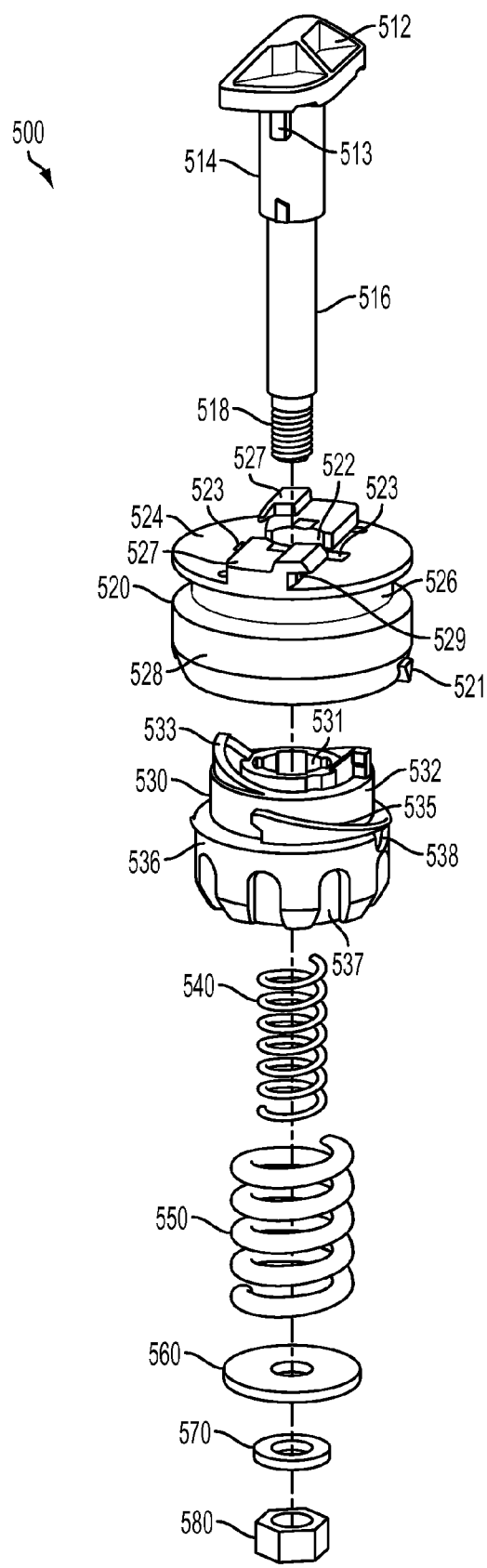

FIG. 5B illustrates an exploded view of clamp 500. Referring to FIG. 5B, T-bolt 510 may be similar to T-bolt 110 described above. For example, T-bolt 510 may include clamping head 512, neck portion 514 and bolt 516 connected to one another and/or formed as a unitary T-shaped structure. T-bolt 510 may include extensions 513 (also referred to herein as key portions 513) located on either side of neck 514 and that extend outwardly in the radial direction from neck 514. Key portions 513 (similar to key portions 113) may align with keyways or slots 228 of joiner 220 when clamp 500 is in a clamped position, similar to that described above with respect to clamp 100. The lower portion of bolt 516 may include a threaded portion 518 used to secure components 520-570 to T-bolt 510 via nut 580.

T-bolt 510 may be inserted into an opening in internal expansion cam 520. For example, referring to FIG. 5B, bolt 516 of T-bolt 510 may be inserted into an oval-shaped opening or bore 522 in a center portion of expansion cam 520. Bolt 516 may engage lift spring 540 and the threaded portion 518 of bolt 516 may extend through lift spring 540. That is, lift spring 540 may encircle or surround bolt 516 when T-bolt 510 is inserted into bore 522 and threaded portion 518 may extend through expansion cam 520, expansion nut 530 and springs 540 and 550 and washers 560 and 570 and mate with corresponding threads of nut 580, as illustrated in FIG. 5A.

Internal expansion cam 520 may include upper portion 524, middle portion 526 and lower portion 528. Upper portion 524 is substantially circular in shape and includes raised portions 527 located on either side of bore 522 and that are located adjacent slots 523 that extend from bore 522. Slots 523 are designed to receive key portions 513 when internal expansion cam/nut 530 is rotated. Raised formations 527 act as tabs to aid in securing joiner 220. For example, formations 527 create open areas 529 which receive sides 227 of joiner 220 when clamp 500 is inserted into opening 226 of joiner 220.

Internal expansion cam/nut 530 includes a central bore 531 that aligns with bore 522. Internal expansion cam/nut 530 may also include an upper portion 532 and a lower portion 536. Upper portion 532 may include angled portions 533 and 535 that slope from a top surface and a bottom surface, respectively, of upper portion 532. Angled portions 533 and 535 may act as surfaces that mate with corresponding surfaces (not shown) located within internal expansion cam 520. In some implementations, the corresponding surfaces in internal expansion cam 120 that mate with angled portions 533 and 535 include teeth to further aid in connecting expansion cam/nut 530 to internal expansion cam 520. Lower portion 536 includes semi-rectangular indentations 537, similar to indentations 139 of clamp 100 that aid in rotating nut 530.

Opening 531, as described above, may align with bore 522 in internal expansion cam 520. In an exemplary implementation, opening 531 may be sized to retain spring 540 to help ensure that retaining spring 540 stays in place within opening 531.

Lift spring 540, compression spring 550, washers 560 and 570 and nut 580 may perform similar functions for clamp 500 as lift spring 140, compression spring 150, washers 160 and 170 and nut 180 described above with respect to clamp 100. As also described above, the lower portion 518 of T-bolt 110 may be threaded to allow T-bolt 510 to be secured by corresponding threads in nut 580. For example, nut 580 may be threaded onto lower portion 518, as illustrated in FIG. 5A.

Clamp 500 illustrated in FIGS. 5A and 5B operates similar to clamp 100 described above to secure strut 210 to joiner 220. For example, clamping head 512 of clamp 500 may be inserted through opening 226 such that the longer sides of clamping head 512 are substantially parallel to sides 227 of opening 226, similar to that illustrated in FIG. 2C with respect to clamp 100. In the unclamped position, key portions 513 ensure that T-bolt 510 remains in the upward mounting position. That is, key portions 513 are not aligned with slots 228 of joiner 220 and therefore, clamping head 512 of T-bolt 510 remains in the upward mounting position.

After clamping head 512 is inserted into opening 226 of joiner 220, an installer may rotate expansion nut 530 approximately 90° (e.g., a ¼ turn) by hand or via a spanner wrench. When expansion nut 530 is rotated, clamping head 512 of T-bolt 510 will drop onto rims 214 of strut 210 as key portion 513 will pass through slots 228 located on the surface of joiner 220. This allows clamping head 510 to drop onto rims 214 and secures clamp 100 to strut 210, similar to that illustrated in FIG. 2D. When key portions 513 align with slots 228 of joiner 220, key portions 513 will also align with slots 523 on the upper surface of internal expansion cam 520.

After T-bolt 512 is secured to strut 210, the installer will continue to rotate expansion nut 530 another 90° (i.e., ¼ turn). This rotation will cause internal expansion cam 520 to rotate and compress compression spring 150 with sufficient force to fasten strut 210 to joiner 220, similar to that illustrated in FIG. 2E. When clamp 500 is in the clamped position, indicator 521 (FIG. 5B) may align with indicator 538 (FIG. 5B) located on expansion cam/nut 530 to let the installer know that clamp 500 is in the clamped position.

Figure 6A:
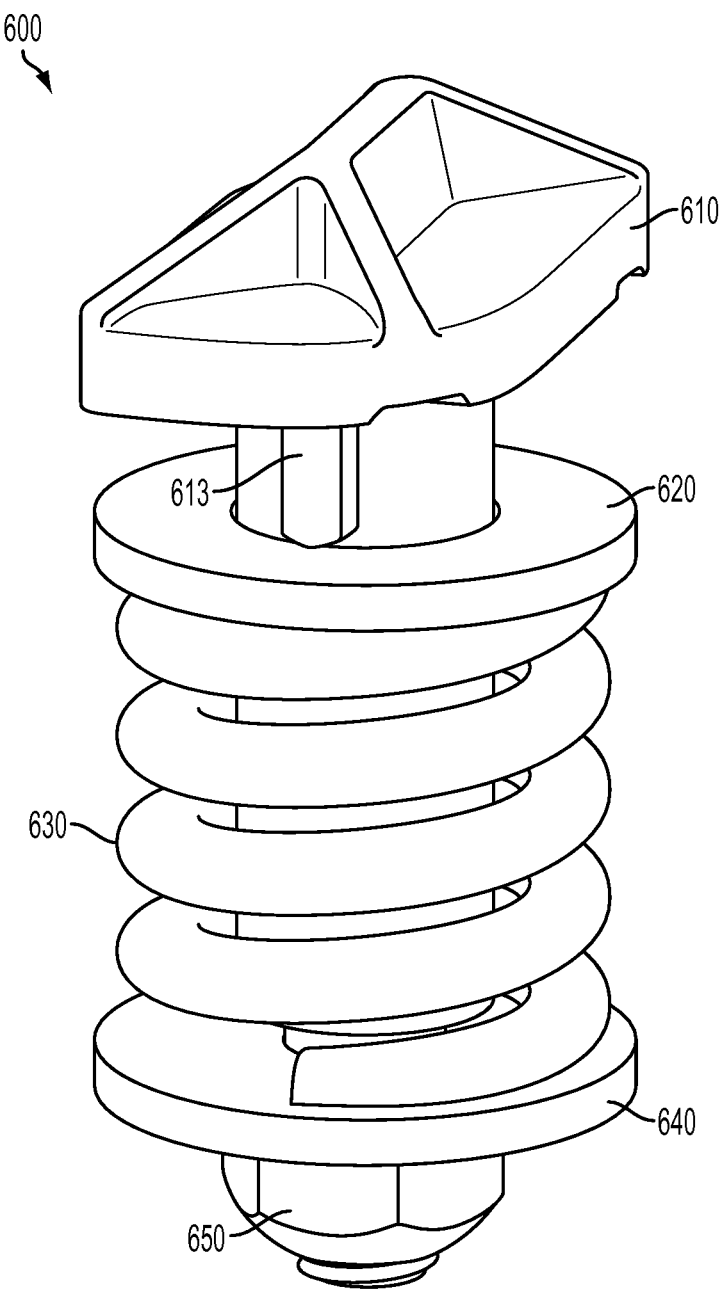
FIGS. 6A and 6B are a perspective view and exploded view, respectively, of an expansion clamp in accordance with still another exemplary implementation.

FIG. 6A is an isometric view of an exemplary clamp assembly 600 (also referred to herein as expansion clamp assembly 600 or expansion clamp 600) consistent with another embodiment described herein. In the embodiment illustrated in FIG. 6A, clamp 600 is configured similarly to clamp 100 with the difference being that no expansion cam and expansion nut are used, as described in detail below. Referring to FIG. 6A, expansion clamp 600 includes T-bolt 610, washer 620, spring 630, washer 640 and nut 650. In an exemplary implementation, the components illustrated in FIG. 6A may be fabricated out of metal, such as steel (e.g., galvanized steel), aluminum or some other metal. In other implementations, all or some of the components illustrated in FIG. 6A may be fabricated using other materials, such as plastic or composite materials.

Figure 6B:
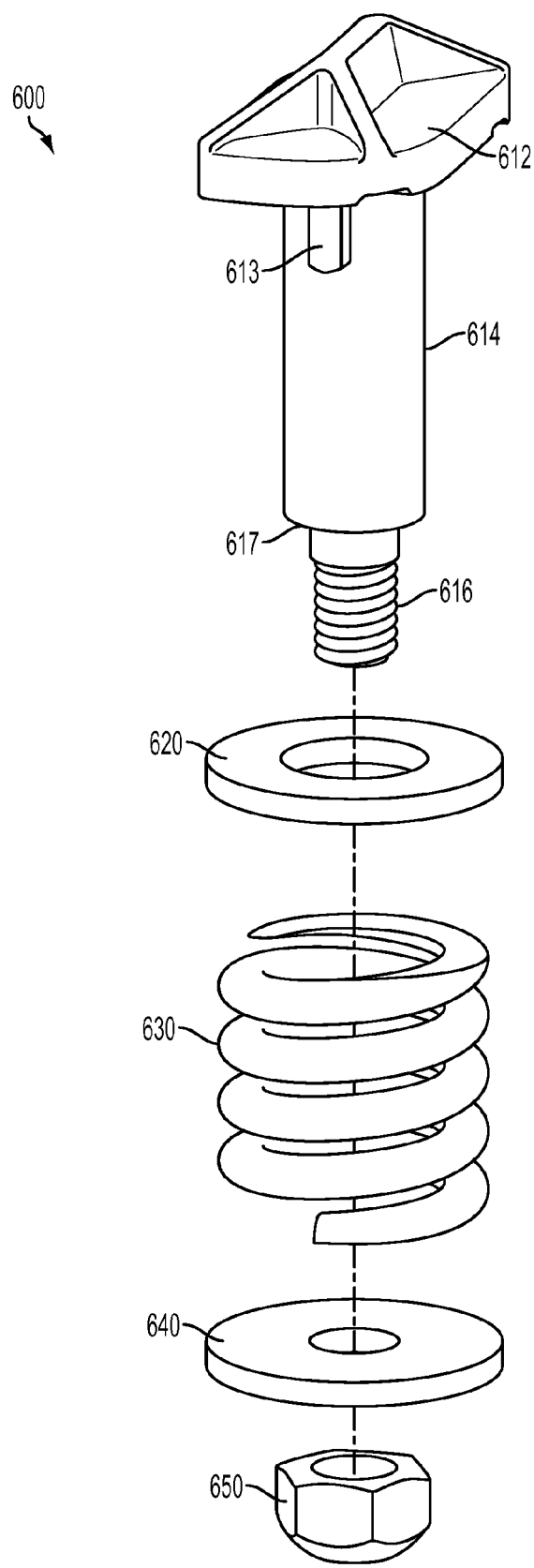

FIG. 6B illustrates an exploded view of clamp 600. Referring to FIG. 6B, T-bolt 610 may be similar to T-bolt 110 described above. For example, T-bolt 610 may include clamping head 612 and bolt 614 connected to one another and/or formed as a unitary T-shaped structure. T-bolt 610 may include extensions 613 (also referred to herein as key portions 613) located on either side of body 614 located adjacent clamping head 612 that extend outwardly in the radial direction from body 614. Key portions 613 (similar to key portions 113) may align with keyways or slots 228 of joiner 220 when clamp 600 is in a clamped position, similar to that described above with respect to clamp 100. The lower portion of bolt 614 may include a threaded portion 616 used to secure T-bolt 610 to nut 650. For example, body 614 may be inserted through washer 620, spring 630 and washer 640, and nut 650 may be secured to lower portion 616 of T-bolt to secure components 620-640 to T-bolt 610, as illustrated in FIG. 6A.

In addition, location 617 on T-bolt 610, referred to herein as shoulder 617, represents the location on T-bolt 610 where T-bolt 610 transitions from main body 614 to the lower portion of bolt 614, including the threaded portion 616. In an exemplary implementation, shoulder 617 and body 614 have a wider circumference than the lower portion of bolt 614, which includes threaded portion 616, as illustrated in FIG. 6B.

Clamp 600 illustrated in FIGS. 6A and 6B operates similar to clamp 100 described above to secure strut 210 to joiner 220. For example, clamping head 612 of clamp 600 may be inserted through opening 226 such that the longer sides of clamping head 612 are substantially parallel to sides 227 of opening 226, similar to that illustrated in FIG. 2C. In the unclamped position, key portions 613 ensure that T-bolt 610 remains in the upward mounting position. That is, key portions 613 are not aligned with slots 228 of joiner 220 and therefore, clamping head 612 of T-bolt 610 remains in the upward mounting position.

After clamping head 612 is inserted into opening 226 of joiner 220, an installer may rotate nut 650 via a wrench until key portions 613 align with keyways 228 of joiner 228. When this occurs, T-bolt 610 will drop onto rims 214 of strut 210 as key portion 613 pass through slots 228 located on the surface of joiner 220. This allows clamping head 610 to drop onto rims 214 and secures clamp 600 to strut 210, as illustrated in FIG. 7.

Figure 7:
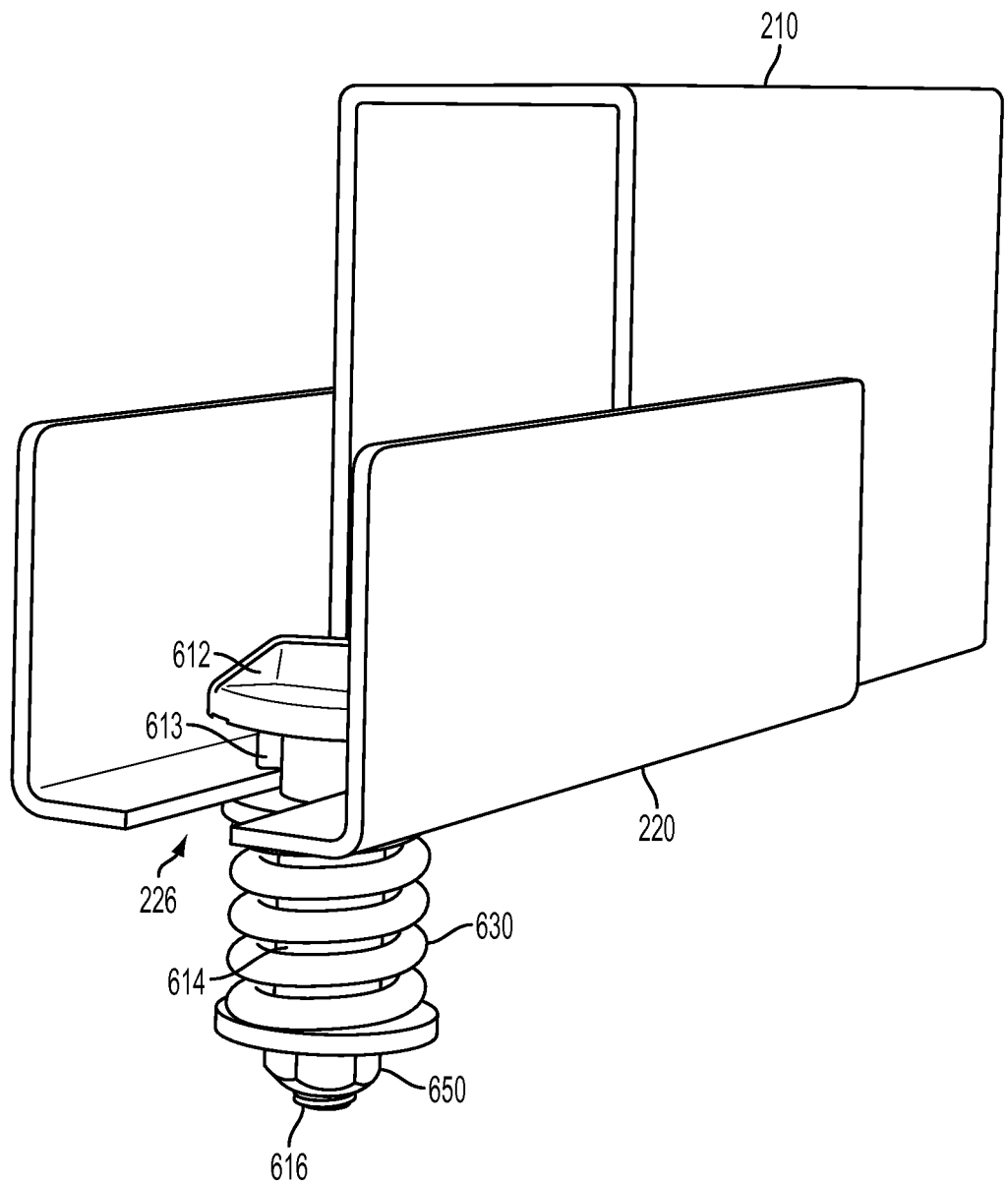
FIG. 7 illustrates a strut structure coupled to a joiner component via the expansion clamp of FIG. 6A according to an exemplary implementation.

Referring to FIG. 7, clamping head 612 has been rotated such that the longer sides of clamping head 612 are perpendicular to opening 226 of joiner 220. In this position, clamping head 612 contacts rims 214 (not shown in FIG. 7) of strut 210, as described above. After T-bolt 612 is secured to strut 210, the installer will continue to rotate nut 650 to compress spring 630 with sufficient force to fasten strut 210 to joiner 220, similar to that illustrated in FIG. 2E.

In one implementation, the installer may rotate nut 650 until washer 640 is seated against shoulder 617 (FIG. 6B) of bolt 614. This compression of spring 630 ensures that joiner 220 is clamped to strut 210 with sufficient clamping force to support various structures, such as solar panels, while simultaneously allowing for thermal expansion and contraction of strut 210, joiner 220 and the structures supported by the strut 210/joiner 220.

In an exemplary implementation, the distance between the upper surface of washer 640 and shoulder 617 while clamp 600 is in the unsecured position (i.e., key portions 613 are not aligned with keyways 228 of joiner 220) may be represented by D2 (not labeled in FIG. 6A or FIG. 7). Further, the distance from the lower portion of clamping head 612 to rims 214 of joiner 220 while clamp 600 is in the unsecured position may be represented by D1 (not labeled in FIG. 7) and the length of spring 630 in the fully compressed state may be represented by Scomp. In accordance with an exemplary implementation, D2>D1+Scomp. In such an implementation, clamp 600 provides sufficient structural integrity for the support structure, while also allowing for thermal expansion and contraction of the structure. That is, spring 630 may further expand or compress to allow for movement of the support structure. In some implementations, thermal expansion and contraction may result in movement of one inch or more of the support structures (e.g., struts 210 and joiner 220). Clamp 600 may allow such movement without experiencing any loss in structural rigidity of the support structure.

Figure 8:
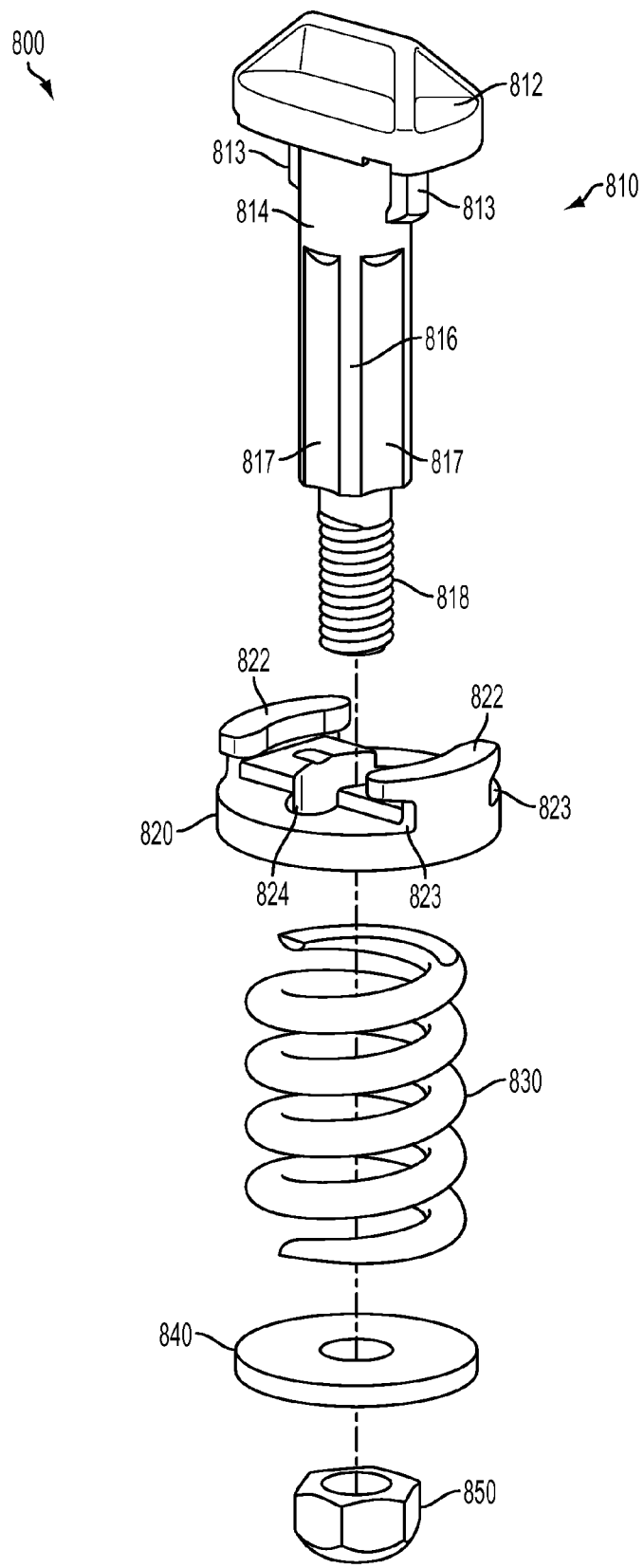
FIG. 8 is an exploded view of an expansion clamp in accordance with yet another exemplary implementation.

FIG. 8 is an exploded via of an exemplary clamp assembly 800 (also referred to herein as expansion clamp assembly 800 or expansion clamp 800) consistent with another embodiment described herein. In the embodiment illustrated in FIG. 8, clamp 800 is configured similarly to clamp 100 with the difference being that no expansion nut is used, as described in detail below. Referring to FIG. 8, expansion clamp 800 includes T-bolt 810, external expansion cam 820, spring 830, washer 840 and nut 850. In an exemplary implementation, the components illustrated in FIG. 8 may be fabricated out of metal, such as steel (e.g., galvanized steel), aluminum or some other metal. In other implementations, all or some of the components illustrated in FIG. 8 may be fabricated using other materials, such as plastic or composite materials.

T-bolt 810 may be similar to T-bolt 110 described above. For example, T-bolt 810 may include clamping head 812, neck 814 and bolt 816 connected to one another and/or formed as a unitary T-shaped structure. T-bolt 810 may include extensions 813 (also referred to herein as key portions 813) located on either side of neck 814 located adjacent clamping head 812 that extend outwardly in the radial direction from body 814. Key portions 813 (similar to key portions 813) may align with keyways or slots 228 of joiner 220 when clamp 800 is in a clamped position, similar to that described above with respect to clamp 100. The main body of bolt 816 may include indentations 817 that run along the length of bolt 816. Alternatively, the main body of bolt 816 may be configured similar to bolt 614 of clamp 600. The lower portion of bolt 816 may include a threaded portion 818 used to secure components 820-840 to T-bolt 810 via nut 850. For example, T-bolt 810 may be inserted through a central opening or bore in external expansion cam 820 (not visible in FIG. 8), spring 830, washer 840 and threaded portion 818 of T-bolt 810 may mate with corresponding threads of nut 850.

External expansion cam 820 may be relatively circular in shape with a central opening or bore to receive body 816 of T-bolt 810. External expansion cam 820 may also include raised portions 822 located on opposite sides of external expansion cam 820. Raised portions 822 may create tabs 823 to receive sides 227 of joiner 220. External expansion cam 820 may also include slots or openings 824 located on either side of the central opening. Slots 824 will align with key portions 824 when nut 850 is rotated, as described in detail below. Compression spring 830, washer 840 and nut 850 may perform similar features as spring 150, washer 160 and nut 180 described above with respect to clamp 100.

Figure 9A:
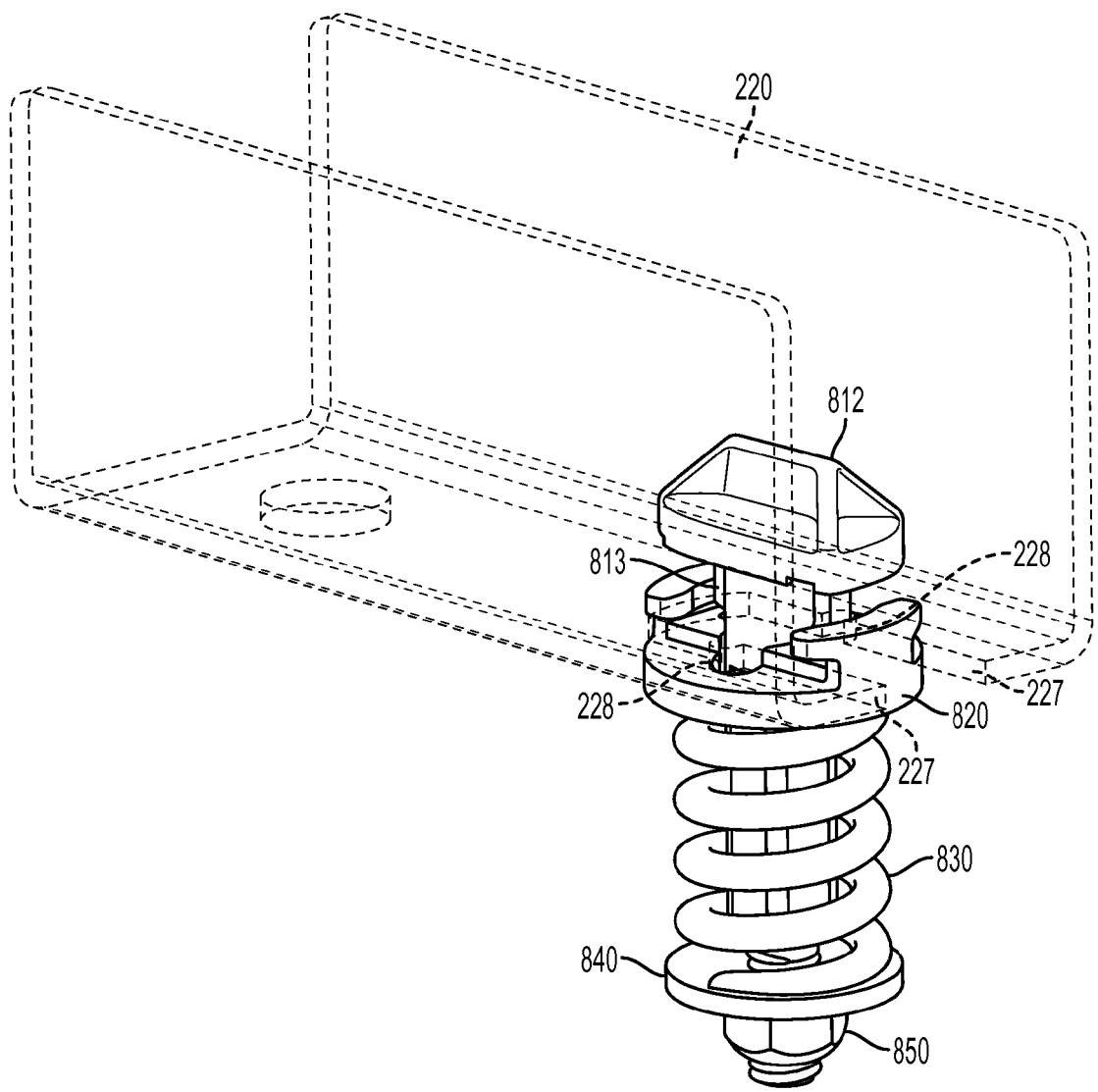
FIGS. 9A-9C illustrate coupling of the clamp of FIG. 8 to a joiner component according to an exemplary implementation.

Clamp 800 illustrated in FIG. 8 operates similar to clamp 100 described above to secure strut 210 to joiner 220. For example, clamping head 812 of clamp 800 may be inserted through opening 226 of joiner 220 such that the longer sides of clamping head 812 are substantially parallel to sides 227 of opening 226, as illustrated in FIG. 9A. Strut 210 is not illustrated in FIG. 9A for simplicity. In the unclamped position, key portions 813 ensure that T-bolt 810 remains in the upward mounting position. That is, key portions 813 are not aligned with slots 228 of joiner 220 and therefore, clamping head 812 of T-bolt 810 remains in the upward mounting position.

Figure 9B:
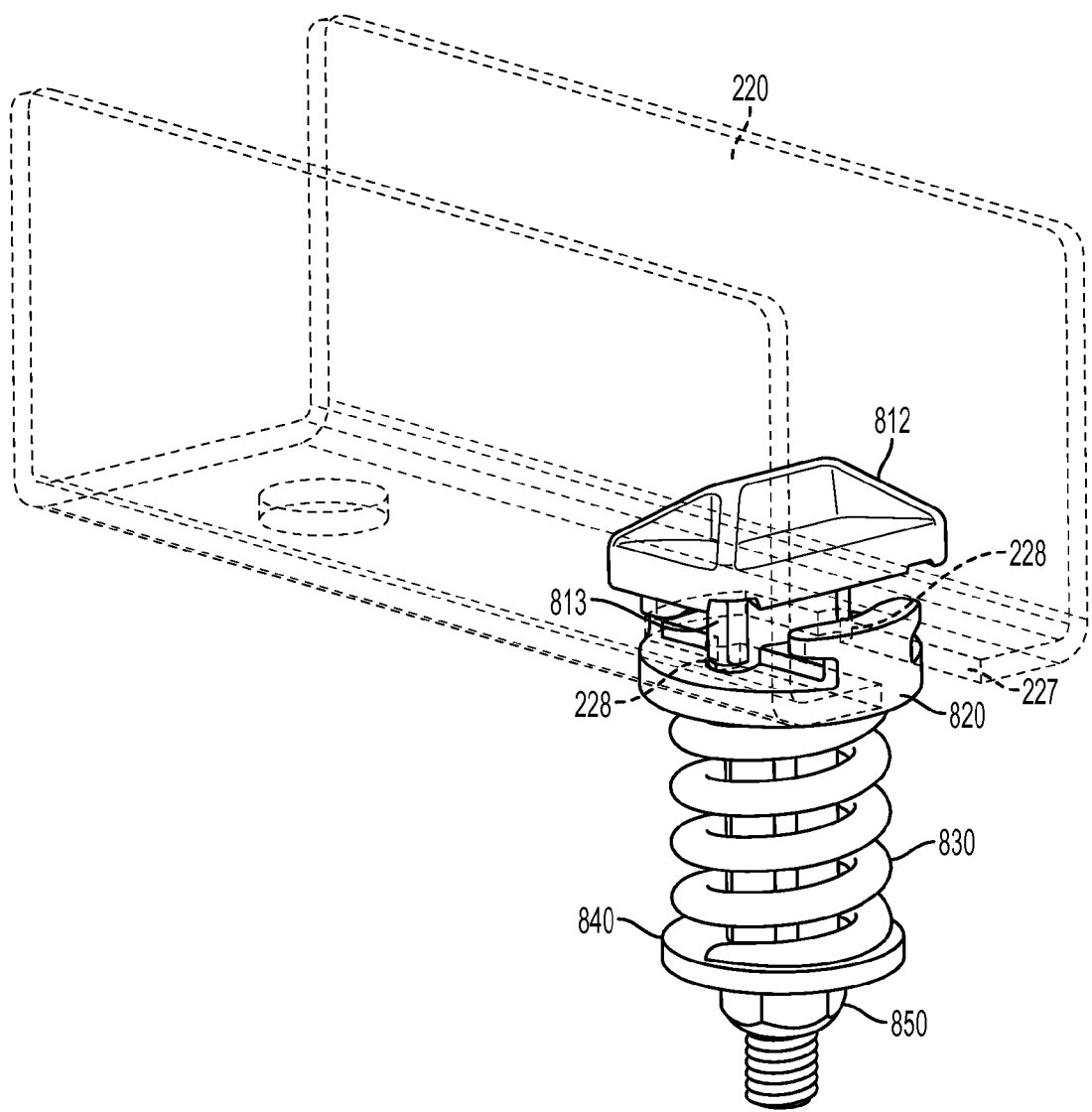
Figure 9C:
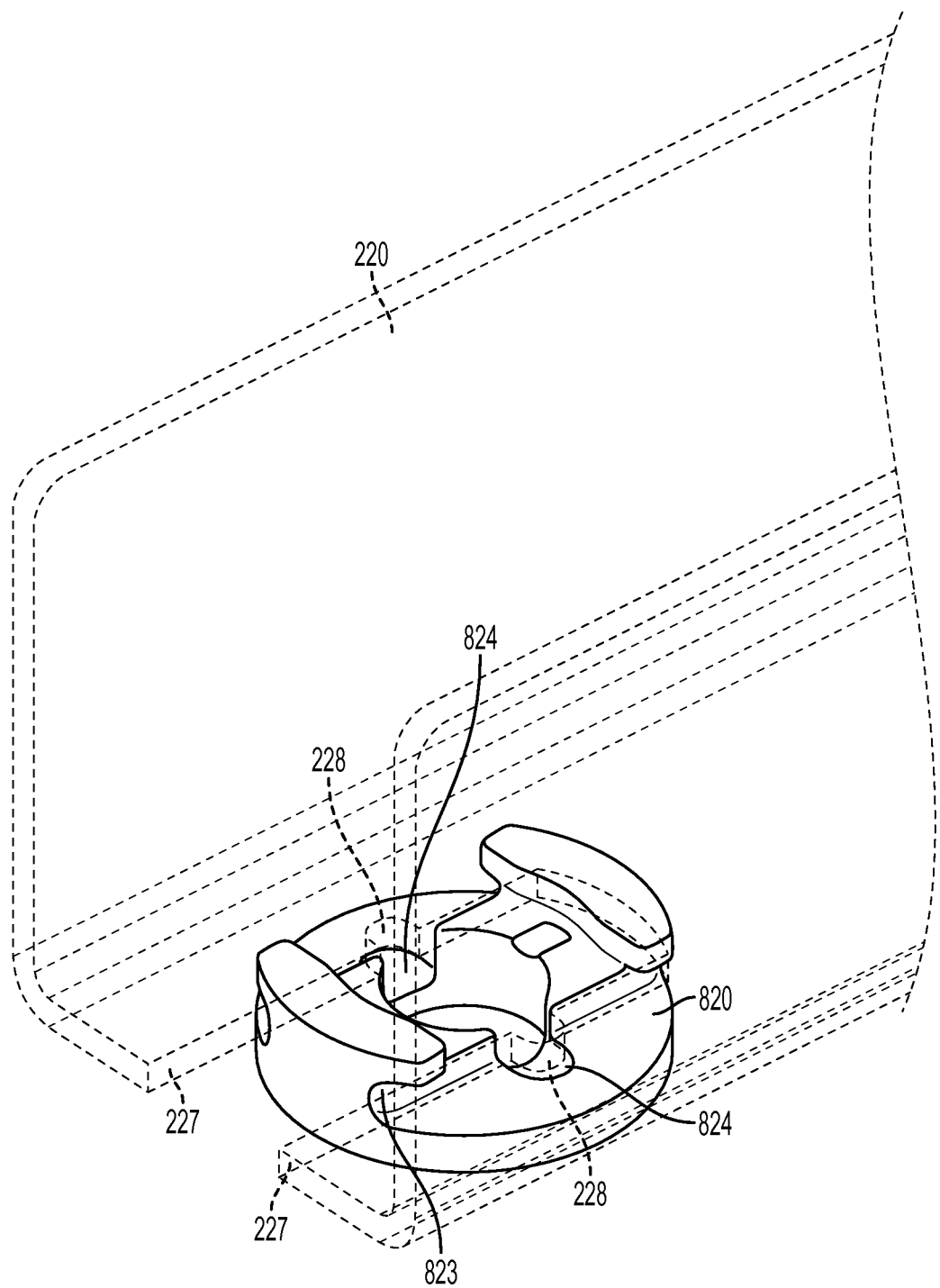

After clamping head 812 is inserted into opening 226 of joiner 220, an installer may rotate nut 850 via a wrench until key portions 813 of clamping head 812 align with keyways 228 of joiner 228, as illustrated in FIG. 9B. When this occurs, clamping head 812 of T-bolt 810 will drop onto rims 214 of strut 210 as key portions 813 pass through slots 228 of joiner 220. This allows clamping head 812 to secure clamp 800 to strut 210. FIG. 9C illustrates the orientation of external expansion cam 820 when keyways 228 are aligned with corresponding slots 824 on expansion cam 820. As illustrated, tabs 823 receive sides 227 of joiner 220. In addition, keyways 228 align with slots 824 such that when key portions 813 align with keyways 228, key portions 813 will also align with openings 824 on external expansion cam 820.

After T-bolt 812 is secured to strut 210, the installer will continue to continue to rotate nut 850 using a wrench. This rotation will apply an upward force to washer 840 and compress compression spring 830 with sufficient force to fasten strut 210 to joiner 220, similar to that illustrated in FIG. 2E.

Implementations described herein provide clamps/clamp assemblies that provide good structural rigidity for components secured by the clamps (e.g., clamps 100, 500, 600 and 800). In each case, the clamp also allows for thermal expansion and contraction of components secured by the clamps (e.g., struts 210 and joiner 220), as well as thermal expansion and contraction of components supported by the structure (e.g., solar panels). In addition, the support structures described herein may allow an installer to erect the support structures without using specialized tools, such as torque wrenches used in conventional nut, bolt and lock washer based connections. This may save considerable time during installation.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to clamp assemblies 100, 500, 600 and 800 mounting a strut to a joiner component. In other implementations, clamp assemblies 100, 500, 600 and 800 may clamp other structures together.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An assembly, comprising:
a first structure having first and second sides and a lower surface connecting the first and second sides, the lower surface including an opening located on one end of the lower surface and first and second slots formed on opposite sides of the lower surface;
a second structure; and
a clamp configured to clamp the second structure to the first structure, the clamp comprising:
a head configured to be inserted adjacent the opening in the first structure,
a body coupled to the head, wherein an upper portion of the body includes formations located on opposite sides of the body and a lower portion of the body is threaded, the head and the body forming a T-shaped structure and the formations extending radially outward from the body,
a nut coupled to the body, wherein the nut includes an opening through which a portion of the body passes and the nut is configured to be rotated such that when the formations on the body are aligned with the first and second slots in the first structure, the head of the clamp is configured to lower onto a portion of the second structure and secure the second structure to the first structure, and
a compression spring disposed around at least a portion of the body and providing a biasing force on the nut,
wherein the first and second slots are configured to receive the formations extending radially outward from the body when the head of the clamp has been lowered onto the portion of the second structure, and
wherein the nut is configured to be further rotated after the head of the clamp has been lowered onto the portion of the second structure, the further rotation of the nut causing compression of the compression spring.

2. The assembly of claim 1, wherein the clamp further comprises:
a first washer located between the formations on the body and a first portion of the spring located closest to the head, and
a second washer located between a second portion of the spring and a surface of the nut, the compression spring providing a biasing force on the first washer.

3. The assembly of claim 2, wherein the compression spring is configured to compress or expand to allow for thermal expansion and contraction of the first structure, the second structure and components supported by the assembly.

4. The assembly of claim 1, wherein the first structure comprises a joiner component and the second structure comprises a first strut, and wherein the joiner component is configured to attach the first strut to a second strut attached to the joiner component.

5. The assembly of claim 1, wherein the head of the clamp has first and second sides that are substantially parallel to each other, and wherein the first and second sides of the head are configured to:
be positioned substantially parallel to the first and second sides of the first structure when the second structure is not clamped to the first structure, and
be positioned substantially perpendicular to the first and second sides of the first structure when the second structure is clamped to the first structure.

6. The assembly of claim 1, wherein the second structure includes rims or curved areas located at a first part of the second structure and wherein the head of the clamp is configured to contact the rims or curved areas when the second structure is clamped to the first structure.

7. An assembly, comprising:
a first structure comprising a lower portion and side portions, the lower portion including an opening located on one end of the first structure, and first and second slots formed on opposite sides of the lower portion; and
a clamp comprising:
a T-shaped structure comprising:
a head, and
a body coupled to the head, the body comprising extensions located on opposite sides of the body and extending radially outward from the body, wherein the body extends through the opening in the first structure;
a cam surrounding a portion of the T-shaped structure, wherein the cam includes a central opening through which a first portion of the body of the T-shaped structure passes;
a spring located adjacent the cam; and
a rotatable nut having an opening through which a second portion of the body of the T-shaped structure passes, and a top portion that couples with a lower portion of the cam,
wherein the spring provides a biasing force on the rotatable nut, and
wherein the rotatable nut is configured to be turned such that when the extensions located on the opposite sides of the body are aligned with the first and second slots in the first structure, the head is configured to lower onto a second structure and secure the second structure to the first structure.

8. The assembly of claim 7, wherein the extensions fit into the first and second slots of the first structure when the extensions are aligned with the first and second slots.

9. The assembly of claim 7, wherein the head of the T-shaped structure is configured to contact rims located on a lower portion of the second structure when the second structure is clamped to the first structure.

10. The assembly of claim 7, wherein the cam is further configured to:
rotate and compress the spring when the rotatable nut is rotated after the head lowers onto the second structure, the compressed spring providing a biasing force on the head of the clamp.

11. The assembly of claim 7, wherein the spring is configured to compress or expand to allow for thermal expansion and contraction of the first structure-and components supported by the assembly.

12. A clamp, comprising:
a T-shaped structure comprising:
a head portion having an upper surface and a lower surface, wherein the lower surface includes a plurality of indentations to receive portions of a first member to be secured to a second member by the clamp, and
a body coupled to the head portion, the body including an upper portion and a lower portion, wherein the upper portion includes extensions that extend outwardly in a radial direction from the upper portion;
a cam surrounding a portion of the T-shaped structure, wherein the cam includes a first central opening surrounding a first portion of the body, the first central opening including slots located on opposite sides of the central opening;

a rotatable nut located adjacent the cam, the rotatable nut including a second central opening and a top portion that couples with a lower portion of the cam to couple the rotatable nut to the cam, the second central opening of the cam surrounding a second portion of the body; and a first spring located adjacent the rotatable nut, the first spring surrounding a third portion of the body and providing a biasing force on the rotatable nut;

wherein the rotatable nut is configured to be turned such that when the extensions of the body are aligned with the slots in the cam, the head portion is configured to lower onto the first member and the extensions are configured to be received by the second member to secure the first member to the second member.

13. The clamp of claim 12, wherein the rotatable nut is configured to be further turned after the extensions of the body are aligned with the slots in the cam, the further turning of the rotatable nut turning the cam and compressing the first spring.

14. The clamp of claim 12, wherein the cam is located externally with respect to the rotatable nut.

15. The clamp of claim 12, wherein the cam is coupled to an inner portion of the rotatable nut.

16. The clamp of claim 12, further comprising:

a second spring disposed around a portion of the body, wherein the second spring is configured to ensure that the body stays in place within the second central opening of the rotatable nut, and the first spring is configured to compress or expand to allow for thermal expansion or contraction of the first member and components secured by the clamp.

17. The clamp of claim 12, wherein the rotatable nut is configured to rotate approximately 180 degrees from an unclamped position to a clamped position.

18. The clamp of claim 12, wherein the cam includes a first indicator located on an external surface of the cam and the rotatable nut includes a second indicator located on an external surface of the rotatable nut, and wherein the first and second indicators are aligned when the clamp is in a clamped position.

* * * * *